(12) United States Patent
Koo et al.

(10) Patent No.: US 10,922,554 B2
(45) Date of Patent: Feb. 16, 2021

(54) ELECTRONIC APPARATUS AND CONTROL METHOD THEREOF

(71) Applicant: Samsung Electronics Co., Ltd., Suwon-si (KR)

(72) Inventors: Bonhyun Koo, Suwon-si (KR); Kyungjae Kim, Suwon-si (KR); Dusan Baek, Suwon-si (KR); Kwanwoo Song, Suwon-si (KR); Dongkeon Kong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/416,826

(22) Filed: May 20, 2019

(65) Prior Publication Data

US 2020/0234057 A1    Jul. 23, 2020

(30) Foreign Application Priority Data

Jan. 21, 2019  (KR) .................. 10-2019-0007382

(51) Int. Cl.
*G06K 9/00* (2006.01)
*H04N 5/247* (2006.01)

(52) U.S. Cl.
CPC ......... *G06K 9/00771* (2013.01); *H04N 5/247* (2013.01)

(58) Field of Classification Search
CPC .............................................. G06K 9/00771
See application file for complete search history.

(56) References Cited

U.S. PATENT DOCUMENTS 8,115,812 B2 * 2/2012 Yoshida ........... H04N 5/232933
                                                   348/159
8,339,455 B2 * 12/2012 Baba .................. G07C 9/00563
                                                   348/156

(Continued)

FOREIGN PATENT DOCUMENTS

JP    2001-099461 A    4/2001
JP    2015-069561 A    4/2015

(Continued)

OTHER PUBLICATIONS

International Search Report dated Jan. 20, 2020, issued in an International Application No. PCT/KR2019/012694.

*Primary Examiner* — Irfan Habib
(74) *Attorney, Agent, or Firm* — Jefferson IP Law, LLP

(57) ABSTRACT

An electronic apparatus for communicating with a camera, and a method thereof are disclosed. The electronic apparatus includes a display, a transceiver, and a processor to, based on receiving an image captured by a camera, control the display to display the captured image, identify an object from the displayed image, determine another camera which captures the object, match information on the other camera with information on the camera, store the information, based on receiving a user command to set a specific object as a tracking target, determine a camera which captures the specific object, based on the specific object disappearing from an image captured by the camera, as the specific object moves, determine another camera which is expected to capture the specific object based on the camera matching information, and track the specific object based on an image captured by the other camera.

20 Claims, 15 Drawing Sheets

(56) References Cited

U.S. PATENT DOCUMENTS

| | | | | |
|---|---|---|---|---|
| 8,515,128 B1* | 8/2013 | Hildreth | | H04N 5/2256 |
| | | | | 382/103 |
| 9,076,268 B2* | 7/2015 | Choi | | G06T 7/254 |
| 9,501,915 B1* | 11/2016 | Laska | | G06F 3/0482 |
| 10,181,197 B2* | 1/2019 | Hirasawa | | G08B 13/19608 |
| 10,202,135 B2* | 2/2019 | Mian | | G08G 1/017 |
| 10,409,855 B2* | 9/2019 | Petrou | | G06K 9/3258 |
| 10,574,943 B2* | 2/2020 | Oami | | H04N 7/181 |
| 2005/0206726 A1* | 9/2005 | Yoshida | | H04N 7/181 |
| | | | | 348/143 |
| 2010/0157062 A1* | 6/2010 | Baba | | G07C 9/00563 |
| | | | | 348/156 |
| 2014/0050455 A1* | 2/2014 | Ni | | H04N 7/181 |
| | | | | 386/224 |
| 2014/0217823 A1* | 8/2014 | Baba | | H02J 13/0017 |
| | | | | 307/35 |
| 2014/0334684 A1* | 11/2014 | Strimling | | G06K 9/3258 |
| | | | | 382/105 |
| 2016/0034762 A1* | 2/2016 | Chang | | G08B 13/1963 |
| | | | | 345/633 |
| 2016/0182482 A1* | 6/2016 | Koo | | H04W 84/18 |
| | | | | 726/7 |
| 2016/0335981 A1 | 11/2016 | Koo et al. | | |
| 2018/0139416 A1* | 5/2018 | Hirasawa | | H04N 5/144 |
| 2018/0308243 A1 | 10/2018 | Justice | | |
| 2019/0304276 A1* | 10/2019 | Lee | | G06K 9/00718 |

FOREIGN PATENT DOCUMENTS

| | | |
|---|---|---|
| KR | 10-1256107 B1 | 5/2013 |
| KR | 10-1321444 B1 | 10/2013 |
| KR | 10-1482646 B1 | 1/2015 |
| KR | 10-1586026 B1 | 1/2016 |
| KR | 10-2016-0075188 A | 6/2016 |
| KR | 101679318 B1 | 11/2016 |
| KR | 10-1777058 B1 | 9/2017 |
| KR | 10-1858396 B1 | 5/2018 |

\* cited by examiner

FIG. 5

|  | Camera 1 | Camera 2 | Camera 3 |
|---|---|---|---|
| Camera 1 | - | 1 | 0 |
| Camera 2 | 1 | - | 1 |
| Camera 3 | 0 | 1 | - |

ELECTRONIC APPARATUS AND CONTROL METHOD THEREOF

CROSS-REFERENCE TO RELATED APPLICATION(S)

This application is based on and claims priority under 35 U.S.C. § 119 of a Korean patent application number 10-2019-0007382, filed on Jan. 21, 2019, in the Korean Intellectual Property Office, the disclosure of which is incorporated by reference herein in its entirety.

BACKGROUND

1. Field

The disclosure relates to an electronic apparatus and a control method. More particularly, the disclosure relates to an electronic apparatus communicating with a camera and a control method thereof.

2. Description of Related Art

Various electronic apparatuses have been developed with the development of electronic technology. In particular, recently, a network camera (or an internet protocol (IP) camera) has been developed.

The network camera is a configuration of a security system, and is installed at various locations such as a street as well as an inside of a building, or the like. With the development of the network camera, various events and accidents may be prevented in advance, and causes of pre-occurred events and accidents may be analyzed clearly.

In the meantime, in order to enhance security, dozens of network cameras are installed on each floor in a large-scale building. In addition, the network camera is installed in a plurality of areas, such as an alley and a crosswalk, or the like, on the street.

Accordingly, there is a need for technology to efficiently manage a plurality of network cameras and a plurality of images captured therefrom.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic apparatus for efficiently managing a network camera and causing an image captured by the network camera to be efficiently used, and a control method thereof.

Additional aspects will be set forth in part in the description which follows and, in part, will be apparent from the description, or may be learned by practice of the presented embodiments.

In accordance with an aspect of the disclosure, an electronic apparatus is provided. The electronic apparatus includes a display, a transceiver including a communication circuitry, and at least one processor configured to, based on receiving, from a camera, an image captured by the camera through the transceiver, control the display to display the captured image, identify an object from the displayed image, based on the object disappearing from the displayed image as the object moves, determine another camera which captures the object from among a plurality of cameras communicating through the transceiver, match information on the other camera with information on the camera, store the information, based on receiving a user command to set a specific object as a tracking target, determine a camera, among the plurality of cameras, which captures the specific object, based on the specific object disappearing from an image captured by the first camera, as the specific object moves, determine another camera which is expected to capture the specific object based on the camera matching information, and track the specific object based on an image captured by the second camera.

The at least one processor, based on information on a plurality of cameras being matched to the information on the camera, is further configured to identify a direction in which the specific object disappears from the displayed image, and determine a camera positioned in the direction in which the specific object disappears as a camera to capture the specific object.

The at least one processor, based on a part of an area of an image captured by the camera and an image captured by the other camera being overlapped and the specific object being present in the overlapped area, is further configured to track the specific object included in an image captured by the other camera.

The at least one processor, based on the specific object disappearing from the displayed image and then not being captured by the other camera for a predetermined time, is further configured to end tracking of the specific object.

The at least one processor is further configured to control the display to display a first indicator on an image received from a camera which captures the specific object, and display a second indicator on an image received from another camera which is expected to capture the specific object.

The at least one processor is further configured to identify a movement path of the object in the displayed image, set an area corresponding to the movement path from among an entire area of the image as an aisle area of the image, and based on receiving a user command to set the camera as a monitoring camera, set the aisle area as a monitoring area and provide notification information in response to an object detected in the monitoring area.

The at least one processor may, based on receiving a user command to select a specific aisle on an electronic map, is further configured to determine at least one camera installed on the specific aisle and set the determined camera as the monitoring camera.

The at least one processor is further configured to display information on a list of external electronic devices which are registrable in an area of the display while an image captured by the camera is being displayed on the display, based on receiving a user command to drag one of a plurality of external electronic devices included in the list to an image captured by the camera, register the external electronic device in an area corresponding to the dragged position from among an entire area on the electronic map, and based on receiving a user command to control the registered external electronic device through the electronic map, transmit a control signal corresponding to the user command to the external electronic device.

The at least one processor is further configured to count a number of objects disappearing to a specific area and a number of objects appearing in the specific area through the displayed image, determine a number of people in a room corresponding to the specific area based on the counted number, and control environment of the room based on the number of people in the room.

The at least one processor is further configured to, based on a plurality of rooms corresponding to the specific area being present, determine a number of people in each of the plurality of rooms, based on the counted number and width of each of the plurality of rooms, and control environment of the plurality of rooms based on the number of the people in the room.

In accordance with another aspect of the disclosure, a control method of an electronic apparatus is provided. The method includes, based on receiving, by a transceiver of the electronic device, an image captured by a camera through the transceiver, displaying the captured image on a display of the electronic apparatus, identifying an object from the displayed image, based on the object disappearing from the displayed image as the object moves, determining another camera which captures the object from among a plurality of cameras communicating through the transceiver, matching information on the other camera with information on the camera, and storing the information, and based on receiving a user command to set a specific object as a tracking target, determining a camera, among the plurality of cameras, which captures the specific object, and based on the specific object disappearing from an image captured by the camera, as the specific object moves, determining another camera which is expected to capture the specific object based on the camera matching information, and tracking the specific object based on an image captured by the other camera.

The determining the other camera may include, based on information on a plurality of cameras being matched to the information on the camera, identifying a direction in which the specific object disappears from the displayed image, and determining a camera positioned in the direction in which the specific object disappears as a camera to capture the specific object.

The tracking of the specific object may include, based on a part of an area of an image captured by the camera and an image captured by the other camera being overlapped and the specific object being present in the overlapped area, tracking the specific object included in an image captured by the other camera.

The control method may further include, based on the specific object disappearing from the displayed image and then not being captured by the other camera for a predetermined time, ending tracking of the specific object.

The control method may further include displaying a first indicator on an image received from a camera which captures the specific object, and displaying a second indicator on an image received from another camera which is expected to capture the specific object.

The control method may further include identifying a movement path of the object in the displayed image, setting an area corresponding to the movement path from among an entire area of the image as an aisle area of the image, and based on receiving a user command to set the camera as a monitoring camera, setting the aisle area as a monitoring area and providing notification information in response to an object detected in the monitoring area.

The setting of the camera as a monitoring camera may include, based on receiving a user command to select a specific aisle on an electronic map, determining at least one camera installed on the specific aisle and setting the determined camera as the monitoring camera.

The control method may further include displaying information on a list of external electronic devices which are registrable in an area of the display while an image captured by the camera is being displayed on the display, based on receiving a user command to drag one of a plurality of external electronic devices included in the list to an image captured by the camera, registering the external electronic device in an area corresponding to the dragged position from among an entire area on the electronic map, and based on receiving a user command to control the registered external electronic device through the electronic map, transmitting a control signal corresponding to the user command to the external electronic device.

The control method may further include counting a number of objects disappearing to a specific area and a number of objects appearing in the specific area through the displayed image and determining a number of people in a room corresponding to the specific area based on the counted number, and controlling environment of the room based on the number of people in the room.

The controlling of the environment may include, based on a plurality of rooms corresponding to the specific area being present, determining a number of people in each of the plurality of rooms, and based on the counted number and width of each of the plurality of rooms, controlling the environment of the plurality of rooms based on the number of the people in the room.

According to various embodiments of the disclosure, a specific object may be tracked while minimizing the computational burden of a processor.

Also, an external electronic device may be simply registered through an image captured by a camera. In addition, energy can be efficiently used by determining the number of people in a room through an image captured by the camera, and controlling the cooling or heating facility of the room.

Further, with only a simple user manipulation, a monitoring area of a camera can be set.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects features, and advantages of certain embodiments of the disclosure will be more apparent from the following description taken in conjunction with the accompanying drawings, in which:

FIG. 5 is a view to describe matching information included in camera matching data according to an embodiment of the disclosure;

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

When it is decided that a detailed description for the known art related to the disclosure may unnecessarily obscure the gist of the disclosure, the detailed description will be omitted.

Various embodiments of the disclosure will be described in detail with reference to the accompanying drawings, but the disclosure is not limited to various embodiments described herein.

Hereinafter, the disclosure will be described in detail with reference to the drawings.

Figure 1:
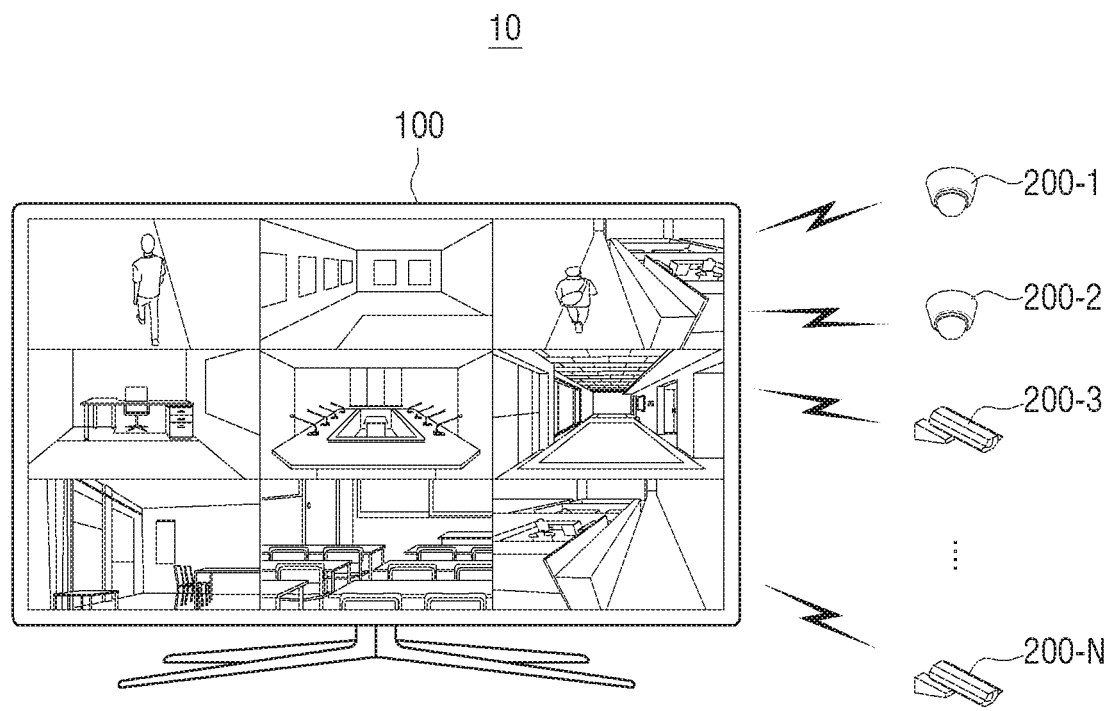
FIG. 1 is a view to describe a security system according to an embodiment of the disclosure.

FIG. 1 is a view to describe a security system according to an embodiment of the disclosure.

Referring to FIG. 1, a security system 10 according to an embodiment of the disclosure includes an electronic apparatus 100 and a camera 200 (e.g. one or more cameras 200-1, 200-2, 200-3 . . . 200-N).

The electronic apparatus 100 and the camera 200 may perform communication. For example, the electronic apparatus 100 and the camera 200 may perform communication through various communication methods such as bluetooth (BT), bluetooth low energy (BLE), wireless fidelity (WI-FI), Zigbee, or the like as well as through local area network (LAN) or Internet network.

The electronic apparatus 100 may receive an image from the camera 200. Here, the image may be an image captured by the camera 200. To be specific, the camera 200 may be installed at a specific location and capture a peripheral area in which the camera 200 is installed. The camera 200 may perform communication with the electronic apparatus 100 and transmit the image captured by the camera 200 to the electronic apparatus 100.

Thereafter, the electronic apparatus 100 may display an image received from the camera 200 on a display.

In the meantime, as illustrated in FIG. 1, the camera 200 may be implemented as a plurality of cameras. For example, a first camera 200-1 may be a camera installed in a first position on a first floor in a building, a second camera 200-2 may be a camera installed in a second position on a first floor in the building, and a third camera 200-3 may be a camera installed in the first position on a second floor in the building. FIG. 1 illustrates four cameras but this is merely exemplary, and the number of cameras is not limited thereto.

In this case, the electronic apparatus 100 may display an image received from each of the plurality of cameras on a display. Specifically, the electronic apparatus 100 may display each image received from different cameras on different areas of the display. For example, as shown in FIG. 1, the electronic apparatus 100 may display an image received from the first camera 200-1 in one area of the display and an image received from the second camera 200-2 in another area of the display.

The electronic apparatus 100 may perform various functions by analyzing the displayed image. This will be described with reference to FIGS. 2 to 13.

Figure 2:
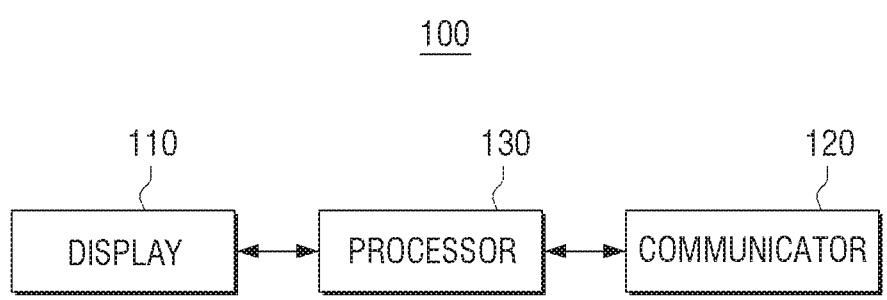
FIG. 2 is a view to describe an electronic apparatus according to an embodiment of the disclosure.

FIG. 2 is a view to describe an electronic apparatus according to an embodiment of the disclosure.

Referring to FIG. 2, the electronic apparatus 100 according to an embodiment includes a display 110, a communicator 120 (e.g., a transceiver), and a processor 130 (e.g., at least one processor).

The display 110 may display various screens. For example, the display 110 may display an image received from the camera. Here, the image received from the camera means an image captured by the camera.

The display 110 may display an image received from a plurality of cameras. Specifically, the display 110 may be embodied as a plurality of display devices to display each image received from a plurality of cameras. Alternatively, the display 110 may be implemented as a single display device, and display each image received from the plurality of cameras through each of the divided display areas.

The display 110 may be implemented in various types such as a liquid crystal display (LCD), plasma display panel (PDP), light emitting diode (LED), or organic light emitting diode (OLED), or the like.

The communicator 120 may communicate with various external devices through various communication methods such as Bluetooth (BT), Bluetooth low energy (BLE), wireless fidelity (WI-FI), Zigbee, or the like as well as through local area network (LAN) or internet network.

For example, the communicator 120 may communicate with a camera and receive, from the camera, an image captured by the camera.

The processor 130 controls overall operations of the electronic apparatus 100. To do this, the processor 130 may include one or more of a central processing unit (CPU), an application processor (AP), or a communication processor (CP).

The processor 130, when an image captured by the camera is received from the camera, may control the display 110 to display the received image.

The processor 130 may analyze the image displayed on the display 110 and acquire identification information corresponding to the object included in the image.

Figure 3:
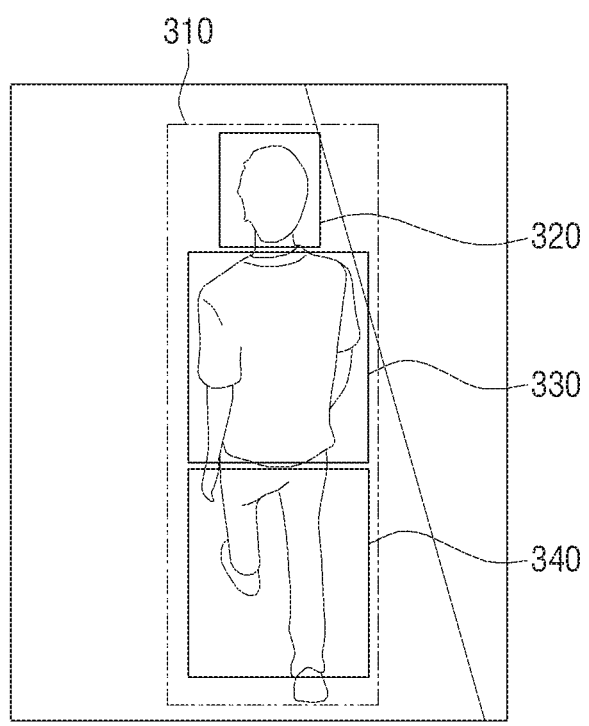
FIG. 3 is a view to describe a method for acquiring identification information corresponding to an object according to an embodiment of the disclosure.

FIG. 3 is a view to describe a method for acquiring identification information corresponding to an object according to an embodiment of the disclosure.

Referring to FIG. 3, the image displayed on the display 110 of the electronic apparatus 100 may include an object 310.

In this case, the processor 130 may acquire identification information corresponding to the object included in the image through image analysis.

For this, the processor 130 may extract a head area 320, a body area 330, and a leg area 340 of the object from the image, first. Here, extraction of the head area 320, the body area 330, and the leg area 340 of the object may be performed by the application of a histogram of oriented gradients (HOG) algorithm, but this is merely exemplary, and extraction of each area may be performed by various algorithms such as a contour detection algorithm, or the like.

The processor 130 may acquire the feature data corresponding to each area. Specifically, the processor 130 may acquire the feature data corresponding to each area based on the ratio of the width to height of each area, and the pixel value included in each area.

For example, the feature data corresponding to the head area 320 may include information on the width to height ratio of the head area, the color of the head area, and the like, and the feature data corresponding to the body area 330 may include the width to height ratio of the body area, and the color of the body area, or the like. The feature data corresponding to the leg area 340 may include information on the width to height ratio of the leg area, the color of the leg area, and the like.

The processor 130 may acquire at least one of the feature data corresponding to the head area, the feature data corresponding to the body area, and the feature data corresponding to the leg area as the identification information of the object.

Accordingly, the processor 130 may identify the object corresponding to the pre-acquired identification information from a plurality of images received from each of the plurality of cameras afterwards.

Meanwhile, the above-described identification information is only exemplary, and the processor 130 may acquire various factors as the identification information of the object. For example, the processor 130 may determine the stride of the object based on the distance traveled per second by the object included in the image, and acquire the stride as the identification information of the object. In addition, the processor 130 may determine a walking pattern of the object and acquire the corresponding walking pattern as identification information of the object.

In addition, the processor 130 may acquire the identification information of the object through an artificial intelligence (AI) model based on neural network. For example, the processor 130 may acquire the identification information of the object through the AI model based on convolution neural network (CNN).

The processor 130 may apply the hash algorithm to the identification information of the object with and acquire an identification ID of the object. Here, the identification ID is a hash value to which a hash algorithm is applied to the identification information obtained by the various methods described above. Through this, the disclosure may efficiently use a memory having a limited size.

It has been described a method of acquiring the identification information corresponding to an object as above, but the processor 130 may acquire identification information corresponding to each of the plurality of objects included in the plurality of images received from each of the plurality of cameras.

Figure 4A:
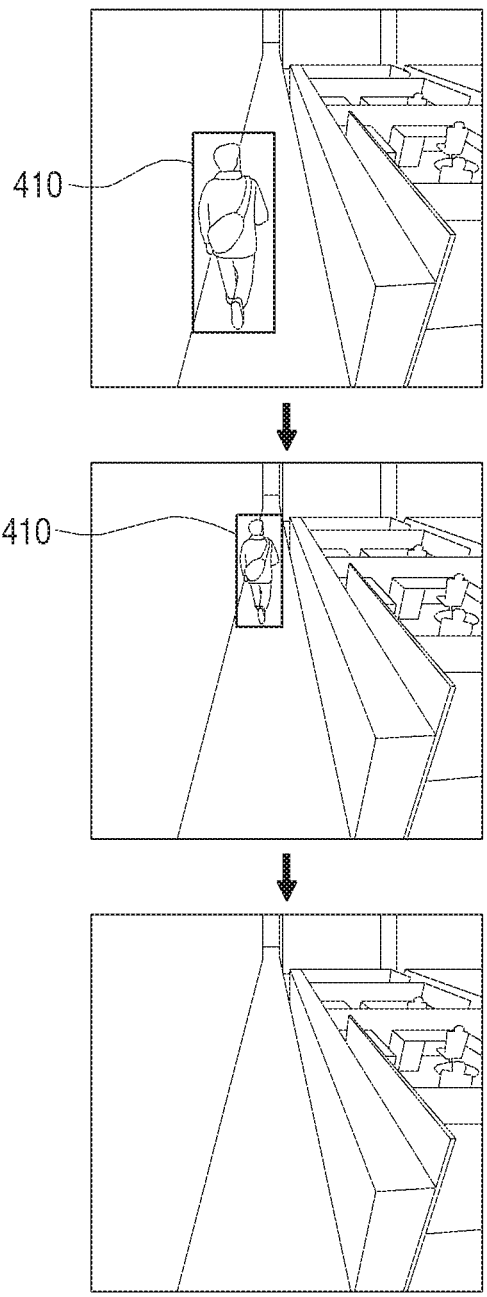
FIG. 4A is a view to describe a method for acquiring camera matching data according to an embodiment of the disclosure.
Figure 4B:
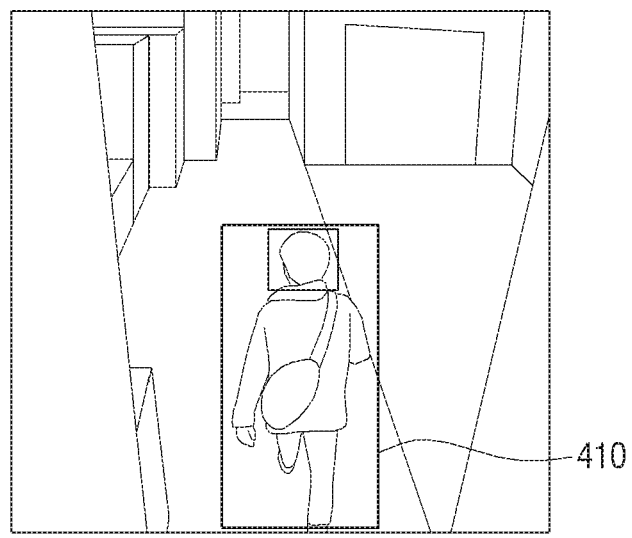
FIG. 4B is a view to describe a method for acquiring camera matching data according to an embodiment of the disclosure.

FIGS. 4A and 4B are views to describe a method for acquiring camera matching data according to various embodiments of the disclosure.

The processor 130 may identify the object corresponding to the identification information pre-acquired from the image displayed on the display 110.

When the identified object moves and disappears from the displayed image, the processor 130 may determine another camera which captures the identified object, among a plurality of cameras communicating through the communicator 120.

To be specific, when the identified object disappears from the displayed image, the processor 130 may identify the object included in the plurality of images received from each of the plurality of cameras and determine another camera which captures the object corresponding to the pre-acquired identification information from among a plurality of cameras.

For example, as shown in FIG. 4A, when an object 410 identified by the image captured by the first camera disappears as the object 410 moves, the processor 130 may identify the object included in a plurality of images received from each of a plurality of cameras, and determine a second camera, which is another camera that captures the object 410 corresponding to the pre-acquired identification information, as illustrated in FIG. 4B.

The processor 130 may match and store information on the camera which currently captures the object 410 to the information on the camera which previously captured the object 410. That is, the information on the second camera in the above embodiment may be matched with the information on the first camera and stored.

By the above method, the processor 130 may track a movement of the identified object 410 and acquire camera matching data including matching information among a plurality of cameras communicating with the electronic apparatus 100.

Here, for convenience of description, it has been described a case of tracking the movement of one object as an example, but the disclosure may obtain identification information of each object included in an image captured by the camera, and camera matching data including matching information among a plurality of cameras based on the movements of all objects.

FIG. 5 is a view to describe matching information included in camera matching data according to an embodiment of the disclosure.

FIG. 5 illustrates that, as matching information included in the camera matching data acquired according to an embodiment, information on the first camera is matched with the information on the second camera, information on the second camera is matched with the information on the first camera and the third camera, and the information on the third camera is matched with the second camera.

According to FIG. 5, it is illustrated that the object which disappeared from the image captured by the first camera appears in an image captured by the second camera afterwards, the object which disappeared from the image captured by the second camera appears in an image captured by the first camera or the third camera afterwards, and the object which disappeared from the image captured by the third camera appears in an image captured by the second camera afterwards.

Figure 6:
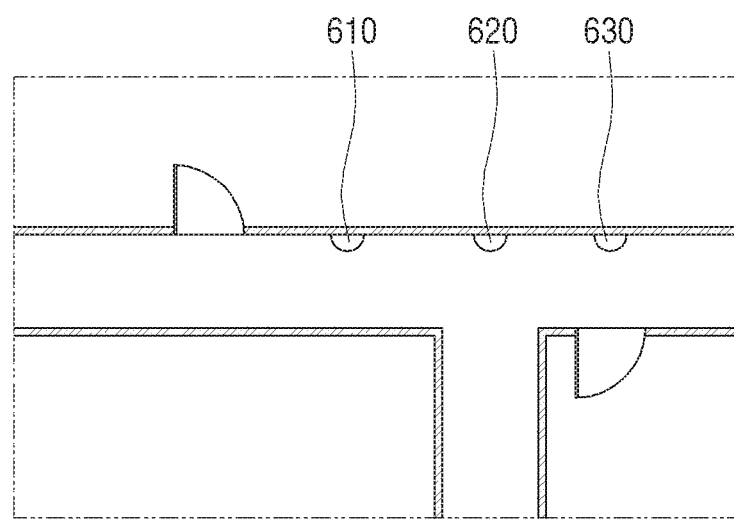
FIG. 6 is a view to describe a drawing including information on a position where a camera is installed according to an embodiment of the disclosure.

Meanwhile, the camera matching data as shown in FIG. 5 may correspond to the drawing as shown in FIG. 6. FIG. 6 is a drawing which describes a position where the first to third cameras are installed according to an embodiment of the disclosure.

Referring to FIG. 6, a user located in an area that is captured by a first camera 610 may pass an area that is captured by a second camera 620, and a user located in an area that is captured by the second camera 620 may pass an area captured by the first camera 610 or the third camera 630. A user located in an area that is captured by the third camera 630 may pass an area captured by the second camera 620. Accordingly, the first to third cameras which are installed as FIG. 6 may be matched as the camera matching data of FIG. 5.

Figure 7:
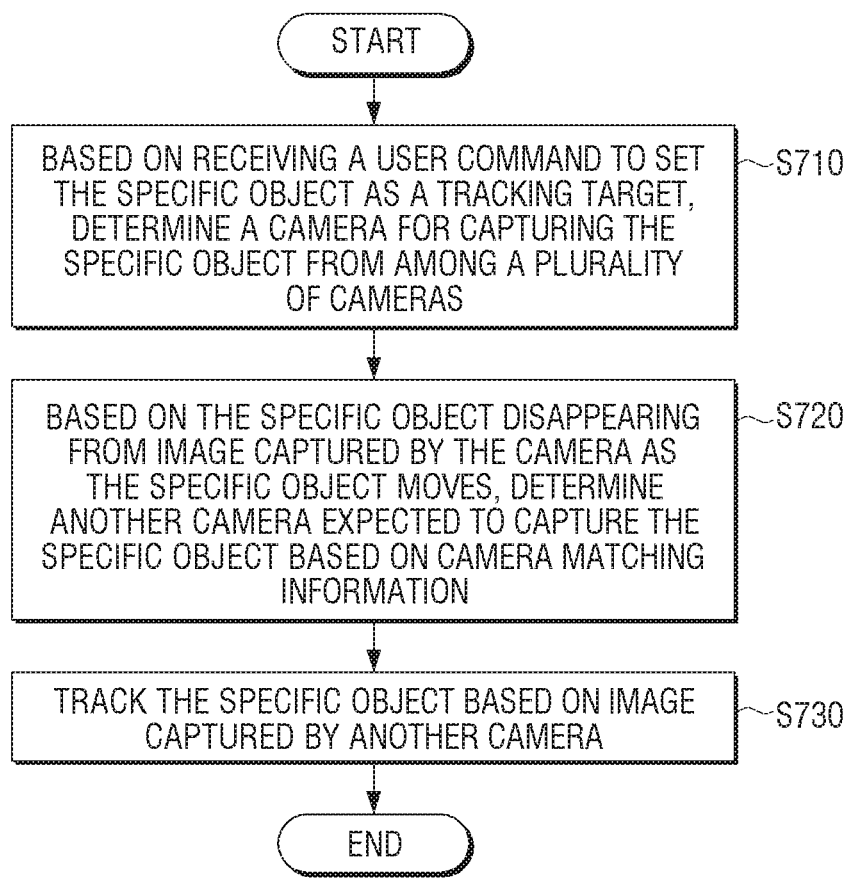
FIG. 7 is a view to describe a method for tracking a specific object according to an embodiment of the disclosure.

FIG. 7 is a view to describe a method for tracking a specific object according to an embodiment of the disclosure.

When a user command to set a specific object as a tracking target is received, the processor 130 may determine a camera which captures a specific object among a plurality of cameras in operation S710.

Specifically, when information capable of identifying a specific object is inputted, the processor 130 may determine a camera for capturing the specific object based on the input information. Here, the information capable of identifying the specific object may be various information such as a ratio of head and body, a ratio of body and leg, a ratio of head and leg, a ratio of head, body, and leg, or various information such as the color of the body, the color of the leg, and the like.

When a user command to select an object displayed on the display 110 is received, the processor 130 may set the selected object as a specific object and determine a camera for capturing the specific object among a plurality of cameras.

When a specific object moves and disappears from an image captured by the camera, the processor 130 may determine another camera which is expected to capture the specific object based on the camera matching information in operation S720.

Specifically, when the specific object disappears from an image captured by the camera as the specific object moves, the processor 130 may determine another camera which is matched with the camera, and determine the determined another camera as a camera which is expected to capture a specific object.

The processor 130 may track the specific object based on the image captured by the another camera as described above in operation S730.

As described above, in the disclosure, an object is tracked by analyzing an image received from a camera which is expected to capture an object, without necessity to track an object by analyzing all the images received from each of the plurality of cameras and thus, the computational burden of a processor may be reduced.

In the meantime, when information on a plurality of cameras is matched with the information on the camera, the processor 130 may identify a direction in which the specific object disappears from the displayed image, and determine a camera located in a direction in which the specific object disappears as a camera to capture the specific object.

For this purpose, when storing the camera matching data, the processor 130 may include information on a direction in which the object disappears in the images captured by each camera and store the same.

For example, the processor 130 may store the camera matching data which further includes information on a direction that, when the object disappears in the first direction in the image captured by the second camera, the object is included in the image captured by the first camera, and when the object disappears in the second direction, the object is included in the image captured by the third camera.

As described above, in the disclosure, when information on a plurality of cameras is matched to the information on the camera, a camera in which the object is expected to appear may be determined and thus, computational burden of a processor may be reduced.

When the specific object is not captured by another camera for a predetermined time after the specific object disappears from the image displayed on the display 110, the processor 130 may end tracking of the specific object. Here, the predetermined time may be set in a diverse manner according to a user command. For example, the predetermined time may be five minutes, ten minutes, 30 minutes, or the like.

To be specific, after the specific object disappears from the image captured by the first camera, if the specific object is not captured by the second camera which is determined by the camera matching information for a predetermined time, the processor 130 may end tracking of the specific object.

Here, the first camera may be a camera which captures an exit of an edifice such as a building. That is, when the specific object is not captured by another camera for a predetermined time after the specific object disappears from the image which is captured by a camera that captures the exit, it is assumed that the specific object goes out of the building and tracking of the object is ended.

Accordingly, the case in which the specific object is kept tracked even when the specific object goes out of a building may be prevented and unnecessary operation of the processor may be prevented.

Figure 8:
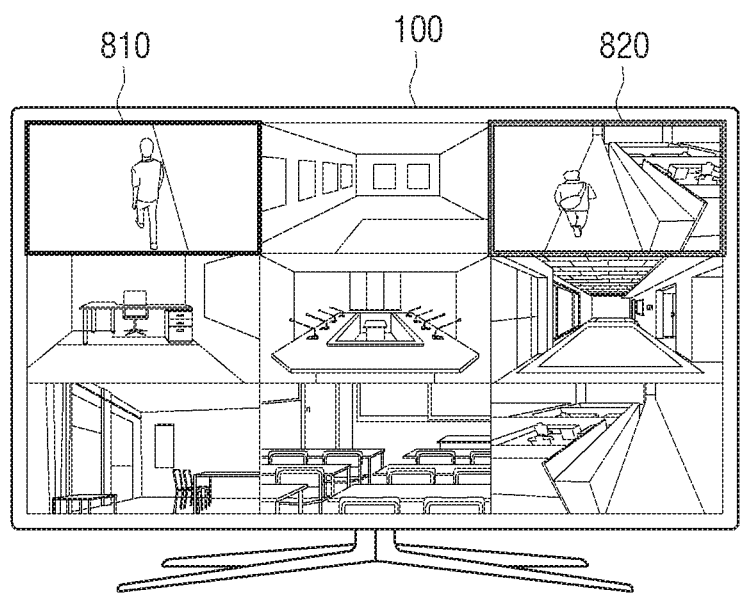
FIG. 8 is a view to describe a screen for tracking an object according to an embodiment of the disclosure.

FIG. 8 is a view to describe a screen for tracking an object according to an embodiment of the disclosure.

The processor 130 may determine a camera which captures the specific object that is set as a tracking target and track the specific object through the image captured by the camera.

In this case, the processor 130 may display an indicator on the image received from the camera which captures the specific object among a plurality of images. For example, referring to FIG. 8, the processor 130 may display an indicator 810 on an edge of the image received from the camera which captures the specific object.

Accordingly, a user of the disclosure may rapidly identify an image which includes the specific object among a plurality of images and monitor a movement of the object.

In the meantime, the processor 130 may determine another camera that is expected to capture the specific object based on the camera matching information. The processor 130 may then display an indicator on the image received from the camera that is expected to capture the specific object. Here, the indicator may be different from the indicator displayed on the image received from the camera which captures the specific object described above.

For example, referring to FIG. 8, the processor 130 may display an indicator 820 on an edge of the image received from the camera which captures the specific object.

Accordingly, the use of the disclosure may identify an image in which the specific object is to be captured and focus on the movements of the object for monitoring.

The indicator described above is merely an example and the indicator may be expressed in various ways.

Figure 9:
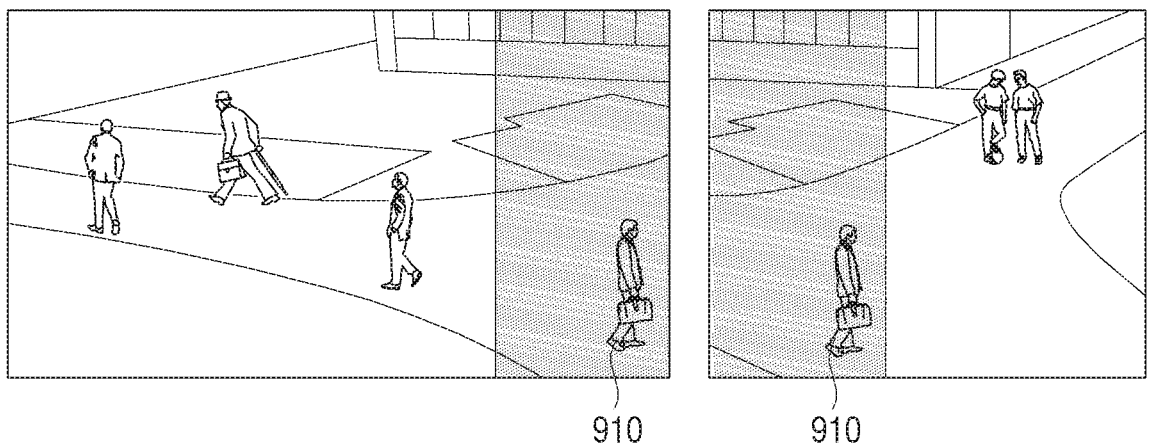
FIG. 9 is a method for tracking an object when a part of an image captured by a camera and an image captured by another camera is overlapped, according to an embodiment of the disclosure.

FIG. 9 is a method for tracking an object when a part of an image captured by a camera and an image captured by another camera is overlapped, according to an embodiment of the disclosure.

As described above, an embodiment in which, when the specific object disappears from the image which is captured by the camera, the specific object is tracked through another camera which is expected to capture the specific object is described.

However, in some cases, the specific object may be included in all of the images captured by different cameras at the same time. For example, as shown in FIG. 9, when the first and second cameras are installed at adjacent positions, a specific object 910 may be included in both images captured by the first and second cameras.

As described above, if a part of an area of the image captured by the camera and the image captured by the another camera overlap each other and the specific object exists in the overlapped area, the processor 130 may track the specific object included in the image captured by the another camera.

Specifically, in a state in which the specific object is tracked through an image captured by the first camera, if the specific object moves, and the specific object moves to an overlapped area among the entire areas of the image captured by the first camera, the processor 130 may determine the second camera which is another camera capturing the overlapped area, and keep tracking the specific object through the image captured by the second camera.

In the meantime, the overlapped area may be predetermined based on the position of the installation of the plurality of cameras.

As described above, in the disclosure, a specific object is tracked in consideration of the overlapped area and thus, even when a specific object is included in all the images captured by different cameras at the same time, the specific object may be kept tracked.

Figure 10:
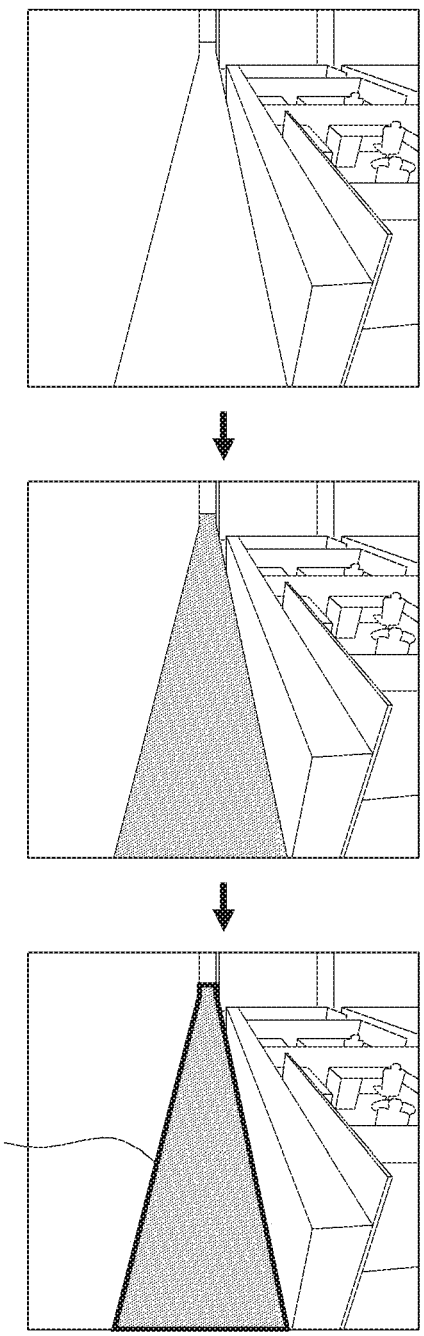
FIG. 10 is a view to describe an embodiment of setting an aisle area as a monitoring area according to an embodiment of the disclosure.

FIG. 10 is a view to describe an embodiment of setting an aisle area as a monitoring area according to an embodiment of the disclosure.

As described above, the processor 130 may identify the object from the image displayed on the display 110.

The processor 130 may confirm a movement path of the object from the displayed image and set an area corresponding to the movement path, from among the entire area of the image, as the aisle area of the image.

To be specific, the processor 130 may track the movement of the object from the image displayed on the display 110 and set the area in which the object moves for a predetermined number of times or more, from among the entire area of the image, as the aisle area of the corresponding image.

For example, referring to FIG. 10, the processor 130 may confirm the movement path of the object on the image displayed on the display 110, and when the object moves over a predetermined number of times through the movement path, the processor 130 may set the area corresponding to the movement path as the aisle area 1010.

Then, the processor 130 may set the aisle area as a monitoring area. Specifically, when a user command for setting the camera as a monitoring camera is received, the processor 130 may set the aisle area set in the camera as the monitoring area. A method of setting the camera as the monitoring camera will be described later with reference to FIG. 11.

Accordingly, in the disclosure, only when a user command to set a camera as a monitoring camera is received, a monitoring area in an aisle area is set without a user input to perform dragging input to set a monitoring area from an image captured by a camera and thus, a monitoring area may be set conveniently.

Then, when the object is detected from the monitoring area, the processor 130 may provide notification information. Here, the notification information may be provided through the display 110 and may be provided to an external device through communication with an external device such as a smartphone, or the like.

Figure 11:
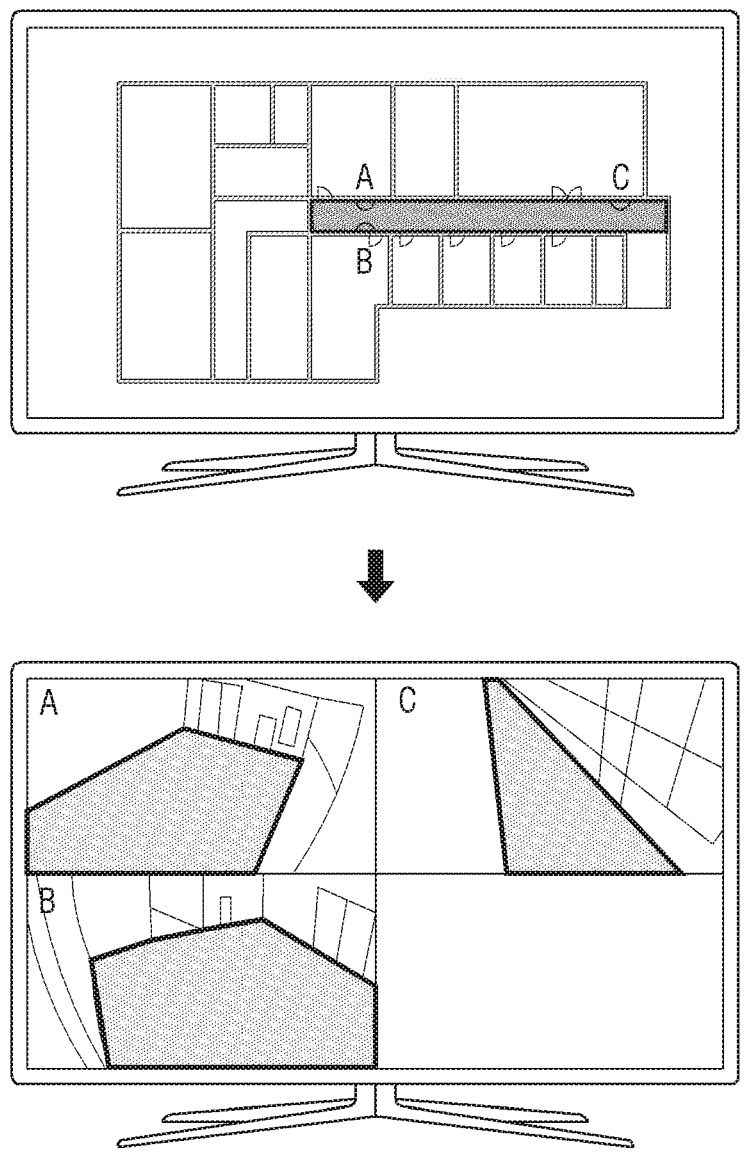
FIG. 11 is a view to describe an embodiment of setting a camera as a monitoring camera according to an embodiment of the disclosure.

FIG. 11 is a view to describe an embodiment of setting a camera as a monitoring camera according to an embodiment of the disclosure.

As described above, when the user command to set a camera as the monitoring camera is received, the processor 130 may set the aisle area which is set in the camera as the monitoring area.

Here, the user command to set the monitoring camera may be received through an electronic map. As illustrated in FIG. 11, the electronic map may include a graphical user interface (GUI) which respectively corresponds to the plurality of cameras based on position information of each of the plurality of cameras.

Specifically, the processor 130 may select a specific camera from among a plurality of cameras displayed on the electronic map, and when a user command to set the selected camera as the monitoring camera is received, may set the selected camera as the monitoring camera.

When a user command for selecting a specific aisle on the electronic map is received, the processor 130 may determine at least one camera installed in the specific aisle, and set the determined camera as the monitoring camera.

Specifically, when a user command for selecting the specific aisle on the electronic map is received, the processor 130 may determine at least one camera located in the selected specific aisle based on the position information in which each of the plurality of cameras is installed, and set the determined camera as the monitoring camera.

For example, as shown in the left side of FIG. 11, if an aisle in which a camera A, a camera B, and a camera C are installed is selected by the dragging input of the user, the processor 130 may determine the camera A, the camera B, and the camera C installed at the corresponding aisle, and set the camera A, the camera B, and the camera C as the monitoring cameras.

Accordingly, as illustrated in the right side of FIG. 11, each of the aisle area of the camera A, the aisle area of the camera B, and the aisle area of the camera C may be set as the monitoring area.

As described above, with a user command to select a specific aisle on the electronic map, a plurality of cameras may be selected as the monitoring cameras at a single stroke, the user convenience would be improved.

Figure 12:
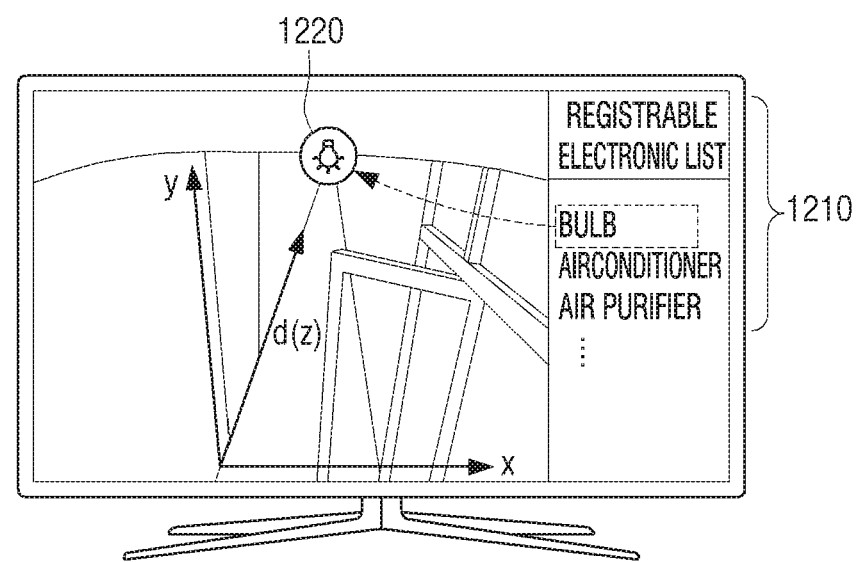
FIG. 12 is a view to describe an embodiment of registering an external device to an electronic apparatus according to an embodiment of the disclosure.
Figure 12:
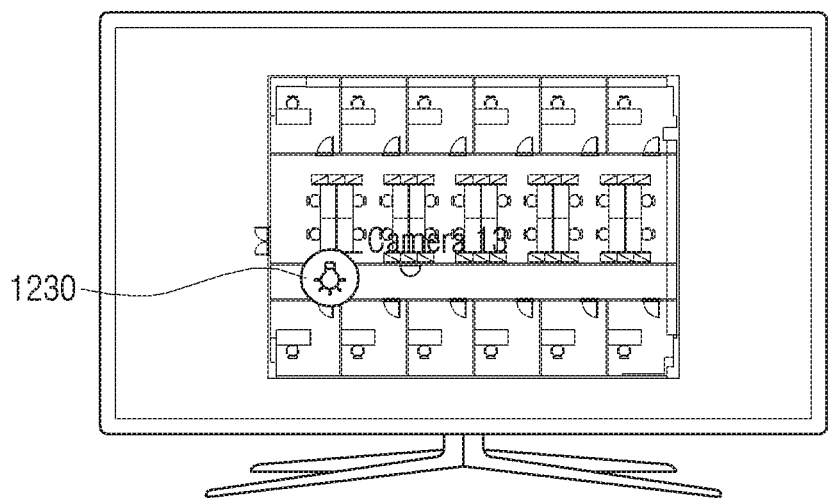

FIG. 12 is a view to describe an embodiment of registering an external device to an electronic apparatus according to an embodiment of the disclosure.

The processor 130 may display the image captured by the camera on the display 110.

At this time, the processor 130 may display information on a list of external electronic devices that may be registered in one area of the display 110. Specifically, the processor 130 may display information on a list of external electronic devices that are not registered in the electronic apparatus among the external electronic devices that communicate through the communicator 120, in one area of the display 110.

When a user command to drag one of the plurality of external electronic devices included in the list to the image captured by the camera is received, the processor 130 may register the external electronic device on an area corresponding to the dragged position, from among the entire area on the electronic map.

Specifically, when the processor 130 receives a user command for dragging one of the plurality of external electronic devices included in the list on the image captured by the camera to the image captured by the camera, the processor 130 may determine the point dragged from the captured image is positioned on the electronic map and register the external electronic device in an area corresponding to the dragged position, in the entire area of the electronic map. Here, the area where the dragged position is located on the electronic map may be calculated based on the position where the camera for capturing the image is installed, the direction in which the camera faces the ground, the coordinates of the point dragged from the image, and the like.

For example, as illustrated in FIG. 12, the processor 130 may display the image received from the camera on one area of the display 110, and information 1210 about a list of external electronic devices that can be registered on another area of the display 110. When a user command for dragging one of the plurality of external electronic devices included in the list to the image captured by the camera is received, an area where the dragged position 1220 in the captured image is located on the electronic map may be calculated based on the coordinates of the point dragged from the image, or the like. Then, the processor 130 may register the external electronic device in the area 1230 corresponding to the dragged position in the entire area of the electronic map. FIG. 12 illustrates an embodiment for registering a bulb which is an external electronic device through an image captured by a $13^{th}$ camera.

As described above, in the disclosure, an external electronic device may be registered through an image that is captured by a camera. Therefore, a user may conveniently register an external electronic device at a point desired for registering the external electronic device while keeping eyes on an image.

Then, when a user command to control the registered external electronic device through the electronic map is received, the processor 130 may transmit a control signal corresponding to the user command to the external electronic device.

Specifically, when a user command for controlling an external electronic device registered through the electronic map is received, the processor 130 may transmit a control signal corresponding to a user command to the external electronic device through the communicator 120. In the meantime, the control signal may be a signal for controlling power of the external electronic device.

Figure 13:
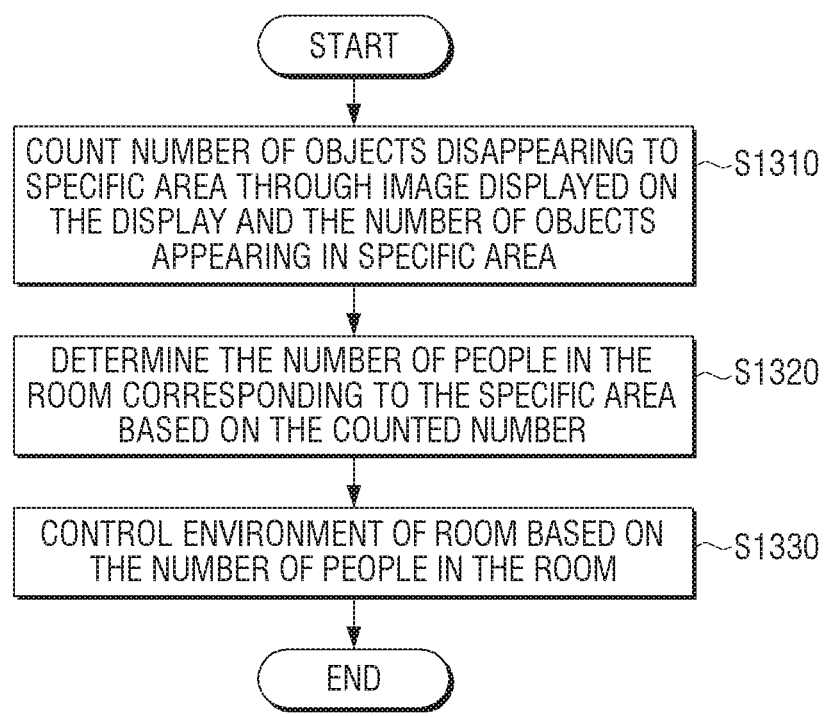
FIG. 13 is a flowchart to describe a method for controlling environment of a room according to an embodiment of the disclosure.

FIG. 13 is a flowchart to describe a method for controlling environment of a room according to an embodiment of the disclosure.

The processor 130 may identify the object from the image displayed on the display 110.

The processor 130 may count the number of objects disappearing into a specific area and the number of objects appearing in a specific area through image analysis. Specifically, the processor 130 may count the number of objects disappearing to a specific area based on the coordinates of the object disappearing from the image, and count the number of the objects appearing in a specific area based on the coordinates of the objects appearing in the image in operation S1310.

Then, the processor 130 may determine the number of people in the room corresponding to the specific area based on the counted number in operation S1320. Here, the room may be a room located in the direction in which the object disappears.

Specifically, the processor 130 may determine the number which is obtained by adding the number of times the object disappears from a specific area and subtracting the number of objects appearing in the specific area through an image analysis, as the number of people in the room corresponding to the specific area.

The processor 130 may control the environment of the room based on the number of the people in the room in operation S1330. Specifically, the processor 130 may control the environment of the room by controlling the cooling or heating facilities of the room based on the number of people in the room. Here, the control may be performed by the electronic apparatus 100 by transmitting a control signal to the cooling or heating facilities of the room, as well as by the electronic apparatus 100 by transmitting a signal requesting control of the cooling or heating facilities to an external device for controlling cooling or heating facilities of the room.

Accordingly, in the disclosure, cooling or heating facilities of the room may be controlled efficiently according to the number of people in the room, and unnecessary energy consumption may be prevented.

In the meantime, the processor 130 may determine the number of people in each of the plurality of rooms based on the counted number and width of each of the plurality of rooms, when there are a plurality of rooms corresponding to the specific area.

Specifically, the processor 130 may determine the number which is obtained by adding the number of objects disappearing to a specific area, subtracting the number of objects appearing in the specific area through image analysis, and distributing the calculated number to be in proportion to the width of each of the plurality of rooms corresponding to the specific area, as the number of people in each of the plurality of rooms.

For example, when the calculated number is 150, the width of the first room out of the plurality of rooms corresponding to the specific area is 50 $m^3$, and the width of the second room is 100 $m^3$, the processor 130 may determine the number of people in the first room as 50 people, and the number of people in the second room as 100 people.

The processor 130 may control environment of the plurality of rooms based on the number of people in each of the plurality of rooms.

Accordingly, in the disclosure, cooling or heating facilities of a plurality of rooms may be controlled according to the number of people in each of the plurality of rooms, thereby preventing unnecessary consumption of energy.

Figure 14:
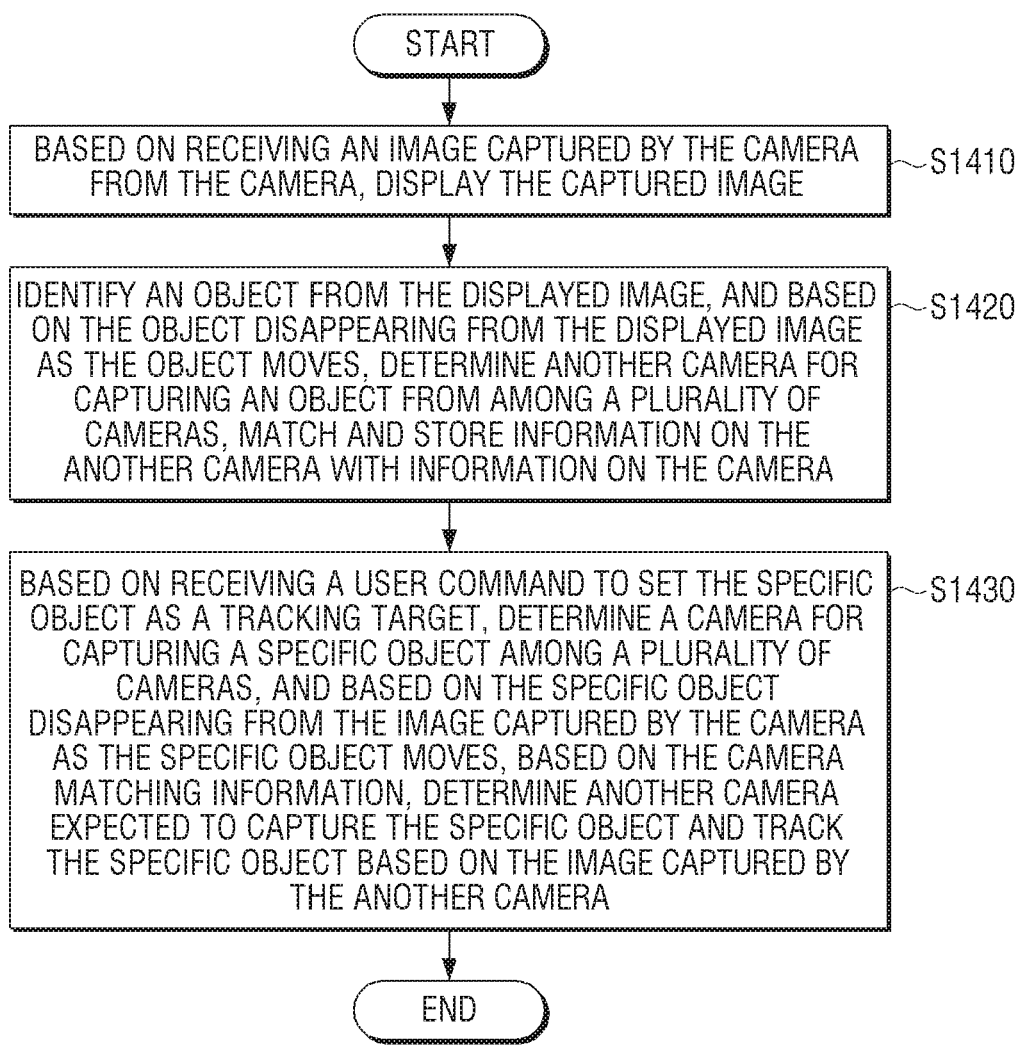
FIG. 14 is a flowchart to describe a control method of the electronic apparatus according to an embodiment of the disclosure.

FIG. 14 is a flowchart to describe a control method of the electronic apparatus according to an embodiment of the disclosure.

The electronic apparatus, when an image captured by the camera is received from the camera, may display the captured image in operation S1410. Here, the camera 200 is a device which is installed at a specific position for capturing a peripheral area where the camera 200 is installed. The camera 200 may communicate with an electronic apparatus through various communication methods such as Bluetooth (BT), Bluetooth low energy (BLE), wireless fidelity (WI-FI), Zigbee, or the like as well as through local area network (LAN) or internet network.

The electronic apparatus may identify an object in the image displayed on the display, and when an object disappears from the displayed image as the object moves, may determine another camera which captures the object, among a plurality of cameras, and store the information on the another camera by matching the information on the another camera with the information on the camera in operation S1420.

Specifically, the electronic apparatus may identify the object in an image displayed on the display, and when the object disappears from the displayed image as the object moves, search the identified object from a plurality of images received from each of a plurality of cameras, determine another camera for capturing the identified object from among a plurality of cameras, and match and store information on the another camera with information on the camera.

Then, when a user command to set the specific object as a tracking target, the electronic apparatus may determine a camera for capturing the specific object from among a plurality of cameras, and when the specific object disappears from an image captured by the camera as the specific object moves, the electronic apparatus may determine another camera which is expected to capture the specific object based on the camera matching information, and track the specific object based on the image captured by the other camera in operation S1430.

Specifically, when a user command for setting the specific object as a tracking object is received, the electronic apparatus may search for the specific object from a plurality of images received from each of the plurality of cameras, determine a camera that captures the specific object, and when the specific object disappears from the image captured by the camera as the specific object moves, the electronic apparatus may determine another camera which is expected to capture the specific object based on the information on the another camera which is matched to the information on the camera which captured the specific object previously, and track the specific object based on the image captured by the another camera.

According to various embodiments of the disclosure, the methods may be implemented as a software or an application form capable of being installed in an existing electronic apparatus.

Also, according to various embodiments of the disclosure, the methods may be implemented only by software upgrade or hardware upgrade of an existing electronic apparatus.

The various embodiments of the disclosure may be implemented through an embedded server of the electronic apparatus or a server outside of the electronic apparatus.

In the meantime, a non-transitory computer readable medium having a program for sequentially performing a control method of the electronic apparatus according to the disclosure may be provided.

The non-transitory computer-recordable medium is not a medium configured to temporarily store data such as a register, a cache, or a memory but an apparatus-readable medium configured to semi-permanently store data. Specifically, the non-transitory apparatus-readable medium may be a compact disc (CD), a digital versatile disc (DVD), a hard disc, a Blu-ray disc, a universal serial bus (USB), a memory card, a read only memory (ROM), and the like.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic apparatus comprising:
a display;
a transceiver configured to communicate with a plurality of cameras; and
at least one processor configured to:
control the display to display a plurality of images received from the plurality of cameras,
determine a camera, from among the plurality of cameras, which captures an object by analyzing the plurality of images,
based on the object disappearing from an image captured by the determined camera as the object moves, determine another camera which captures the object from among the plurality of cameras by analyzing the plurality of images,
generate camera matching information by matching information on the other camera with information on the camera,
store the camera matching information,
based on receiving a user command to set a specific object as a tracking target, determine a camera, from among the plurality of cameras, which captures the specific object,
based on the specific object disappearing from an image captured by the camera, as the specific object moves, determine another camera which is expected to capture the specific object based on the camera matching information, and
track the specific object based on an image captured by the other camera.

2. The electronic apparatus of claim 1, wherein, the at least one processor, based on information on a plurality of cameras being matched to the information on the camera, is further configured to:
identify a direction in which the specific object disappears from the displayed image; and
determine a camera positioned in the direction in which the specific object disappears as a camera to capture the specific object.

3. The electronic apparatus of claim 1, wherein the at least one processor, based on a part of an area of an image captured by the camera and an image captured by the other camera being overlapped and the specific object being present in the overlapped area, is further configured to track the specific object included in an image captured by the other camera.

4. The electronic apparatus of claim 1, wherein the at least one processor, based on the specific object disappearing from the displayed image and then not being captured by the other camera for a predetermined time, is further configured to end tracking of the specific object.

5. The electronic apparatus of claim 1, wherein the at least one processor is further configured to control the display to:
   display a first indicator on an image received from a camera which captures the specific object; and
   display a second indicator on an image received from another camera which is expected to capture the specific object.

6. The electronic apparatus of claim 1, wherein the at least one processor is further configured to:
   identify a movement path of the object in the displayed image;
   set an area corresponding to the movement path from among an entire area of the image as an aisle area of the image; and
   based on receiving a user command to set the camera as a monitoring camera, set the aisle area as a monitoring area and provide notification information in response to an object detected in the monitoring area.

7. The electronic apparatus of claim 6, wherein the at least one processor, based on receiving a user command to select a specific aisle on an electronic map, is further configured to determine at least one camera installed on the specific aisle and sets the determined camera as the monitoring camera.

8. The electronic apparatus of claim 1, wherein the at least one processor is further configured to:
   display information on a list of external electronic devices which are registrable in an area of the display while an image captured by the camera is being displayed on the display;
   based on receiving a user command to drag one of a plurality of external electronic devices included in the list to an image captured by the camera, register the external electronic device in an area corresponding to the dragged position from among an entire area on the electronic map; and
   based on receiving a user command to control the registered external electronic device through the electronic map, transmit a control signal corresponding to the user command to the external electronic device.

9. The electronic apparatus of claim 1, wherein the at least one processor is further configured to:
   count a number of objects disappearing to a specific area and a number of objects appearing in the specific area through the displayed image, determine a number of people in a room corresponding to the specific area based on the counted number, and
   control environment of the room based on the number of people in the room.

10. The electronic apparatus of claim 9, wherein the at least one processor is further configured to:
    based on a plurality of rooms corresponding to the specific area being present, determine a number of people in each of the plurality of rooms, based on the counted number and width of each of the plurality of rooms; and
    control environment of the plurality of rooms based on the number of the people in the room.

11. A control method of an electronic apparatus, the method comprising:
    displaying a plurality of images received from a plurality of cameras;
    determining a camera, from among the plurality of cameras, which captures an object by analyzing the plurality of images;
    based on the object disappearing from an image captured by the determined camera as the object moves, determining another camera which captures the object from among the plurality of cameras by analyzing the plurality of images;
    generating camera matching information by matching information on the other camera with information on the camera;
    storing the camera matching information;
    based on receiving a user command to set a specific object as a tracking target, determining a camera, among the plurality of cameras, which captures the specific object;
    based on the specific object disappearing from the image captured by the camera, as the specific object moves, determining another camera which is expected to capture the specific object based on the camera matching information; and
    tracking the specific object based on an image captured by the other camera.

12. The method of claim 11, wherein the determining of the other camera comprises:
    based on information on a plurality of cameras being matched to the information on the camera, identifying a direction in which the specific object disappears from the displayed image; and
    determining a camera positioned in the direction in which the specific object disappears as a camera to capture the specific object.

13. The method of claim 11, wherein the tracking of the specific object comprises:
    based on a part of an area of an image captured by the camera and an image captured by the other camera being overlapped and the specific object being present in the overlapped area, tracking the specific object included in an image captured by the other camera.

14. The method of claim 11, further comprising:
    based on the specific object disappearing from the displayed image and then not being captured by the other camera for a predetermined time, ending tracking of the specific object.

15. The method of claim 11, further comprising:
    displaying a first indicator on an image received from a camera which captures the specific object; and
    displaying a second indicator on an image received from another camera which is expected to capture the specific object.

16. The method of claim 11, further comprising:
    identifying a movement path of the object in the displayed image;
    setting an area corresponding to the movement path from among an entire area of the image as an aisle area of the image; and
    based on receiving a user command to set the camera as a monitoring camera, setting the aisle area as a monitoring area and providing notification information in response to an object detected in the monitoring area.

17. The method of claim 16, wherein the setting of the camera as a monitoring camera comprises:
    based on receiving a user command to select a specific aisle on an electronic map, determining at least one camera installed on the specific aisle; and
    setting the determined camera as the monitoring camera.

18. The method of claim 11, further comprising:
    displaying information on a list of external electronic devices which are registrable in an area of a display while an image captured by the camera is being displayed on the display;

based on receiving a user command to drag one of a plurality of external electronic devices included in the list to an image captured by the camera, registering the external electronic device in an area corresponding to the dragged position from among an entire area on the electronic map; and based on receiving a user command to control the registered external electronic device through the electronic map, transmitting a control signal corresponding to the user command to the external electronic device.

19. The method of claim 11, further comprising:

counting a number of objects disappearing to a specific area and a number of objects appearing in the specific area through the displayed image and determining a number of people in a room corresponding to the specific area based on the counted number; and controlling environment of the room based on the number of people in the room.

20. The method of claim 19, wherein the controlling of the environment comprises:

based on a plurality of rooms corresponding to the specific area being present, determining a number of people in each of the plurality of rooms; and based on the counted number and width of each of the plurality of rooms, controlling the environment of the plurality of rooms based on the number of the people in the room.

\* \* \* \* \*